(12) United States Patent
Eleftheriou

(10) Patent No.: US 9,024,882 B2
(45) Date of Patent: May 5, 2015

(54) DATA INPUT SYSTEM AND METHOD FOR A TOUCH SENSOR INPUT

(75) Inventor: Kostas Eleftheriou, San Francisco, CA (US)

(73) Assignee: Fleksy, Inc., San Francisco, CA (US)

(*) Notice: Subject to any disclaimer, the term of this patent is extended or adjusted under 35 U.S.C. 154(b) by 61 days.

(21) Appl. No.: 13/531,200

(22) Filed: Jun. 22, 2012

(65) Prior Publication Data

US 2013/0021248 A1     Jan. 24, 2013

Related U.S. Application Data

(60) Provisional application No. 61/508,829, filed on Jul. 18, 2011.

(51) Int. Cl.
*G06F 3/02*          (2006.01)
*G06F 3/023*        (2006.01)
*G06F 3/0488*      (2013.01)

(52) U.S. Cl.
CPC ............ *G06F 3/0233* (2013.01); *G06F 3/0237* (2013.01); *G06F 3/04883* (2013.01); *G06F 3/04886* (2013.01)

(58) Field of Classification Search
CPC .... G06F 3/0202; G06F 3/0219; G06F 3/0213; G06F 3/04886; G06F 3/04883; G06F 3/0236
USPC ................. 345/156, 162, 168–169, 172–175, 345/684–689; 707/742, 780; 715/257, 773; 382/229
See application file for complete search history.

(56) References Cited

U.S. PATENT DOCUMENTS

| | | | |
|---|---|---|---|
| 7,030,863 B2 * | 4/2006 | Longe et al. ................... | 345/173 |
| 7,175,438 B2 * | 2/2007 | Levy .............................. | 434/167 |
| 7,487,147 B2 * | 2/2009 | Bates et al. ........................ | 1/1 |
| 2007/0016572 A1 * | 1/2007 | Bates et al. ....................... | 707/5 |

* cited by examiner

*Primary Examiner* — Kevin M Nguyen
(74) *Attorney, Agent, or Firm* — Morgan, Lewis & Bockius LLP

(57) ABSTRACT

A data input system for a touch sensor input identifies words input as a set of points by a user. The intended word is identified by determining an origin and points associated with letters on a log polar coordinate system. The log distances and angles of the points are then compared to log distances and angles for known words stored in a computer memory. The known word having the log distances and angles that most closely match the input points is identified as the intended word.

16 Claims, 7 Drawing Sheets

DATA INPUT SYSTEM AND METHOD FOR A TOUCH SENSOR INPUT

CROSS REFERENCE TO RELATED APPLICATIONS

This application claims priority to U.S. Provisional Patent Application No. 61/508,829, "DATA INPUT SYSTEM AND METHOD FOR A TOUCH SENSOR INPUT" filed Jul. 18, 2011 which is hereby incorporated by reference.

BACKGROUND

Typing text on a touch sensitive screen can be quite a challenge as trying to pinpoint tiny letters on the keyboards of many mobile devices leads to spelling errors. Although there have been many and various approaches trying to aid the typists they all assume a static representation of the virtual keyboard at a predefined location on the touch screen of the device. Typically, touch screen systems display a keyboard and deduce the intended user text based on the absolute defined locations of the letters on the on-screen keyboard. Given the deduced text, they do not adjust or adapt the keyboard, missing the opportunity to further decrease future typing errors

SUMMARY OF THE INVENTION

The present invention is directed towards a data input system for a touch sensor input identifies words input as a set of points by a user. The intended word can be identified by determining an origin and points associated with each of the letters on a log polar coordinate system. The log distances and angles of the points on the log polar coordinate system can then compared to a database of log distances and angles for known words stored in a computer memory. The known word from the database having the log distances and angles that most closely match the input points can be identified as the intended word.

If an error has been made and the best candidate word that was displayed is not the intended word, the user can input the intended word and the system can analyze where the error was made. In many cases, the user may have a tendency to type certain points in an atypical manner that is offset from a normal QWERTY or other keyboard pattern. The system can make the necessary adjustments to correct this problem so that when the user types the same intended word, the correct prospective word will be selected by the system. The system can remember the user input tendencies for certain letters and use this information when selecting the intended words.

In other embodiments, weights for the radial distance values can be applied to the input letters. The described anchor point calculation above can be an example of a uniform weight applied to each point. It is also possible to apply weights in a non-uniform manner with some letters receiving different weights. For example, the weights can be applied asymmetrically by increasing the weight with each incremental point position for each letter. The weighting should be applied uniformly to both the input intended word as well as all candidate words.

In an embodiment, the angular values from an anchor point for the input points of the intended word can be determined. Angular values can be measurements that extend around a circle such as 360° and then repeat with higher angles. These values can then be compared to the angular values for the prospective words and the $\Delta\theta$ can be determined for each point.

In an embodiment, the $\Delta\theta$ values can be plotted with respect to each letter. A line drawn between the origin and the end point represents a vector that has an angle that is the average shift angle between the input intended word and the prospective word. The angular similarity can be measured by observing the "straightness" (circular variance) of the $\Delta\theta$ vectors, which is a function of the sum of the lengths of those vectors and the length of the combined vector. The more similar those two values are, the more uniform the delta angle vectors are. The intended word can have the most similar $\Delta\theta$ vectors.

In an embodiment, the dictionary database may store words by their normal spelling as well as by the number of points and in groups by prefix. Because the shape of a word is based upon the number of points, the system may initially only search for matching word shapes that have the same number of points. However, the system can also search based upon matching prefixes which may represent a distinct shape. Various other search processes can be performed to optimize the dictionary database search results.

DETAILED DESCRIPTION

Figure 1:
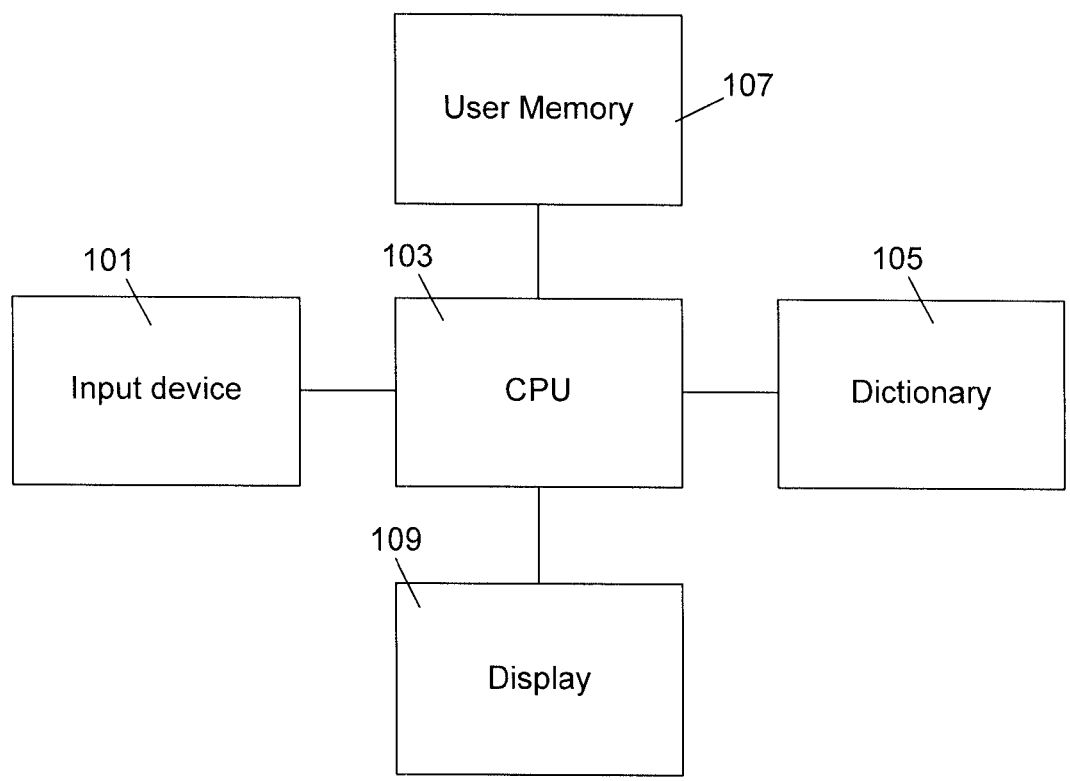
FIG. 1 illustrates a block diagram of the system components.

The present invention is an input system and method for interpreting words input through the input devices. The system does not assume a fixed position of a keyboard and can be used on all devices including tablets, cell phones and other mobile devices and personal computers. The system can be used with any type of location based input system including touch pads, pointing devices, position sensors, etc. Clothing can be fabricated that has integrated input sensors. The system can be used by visually impaired people.

The system can be a standalone device such as a software system. Alternatively, it can be integrated into an operating system such as MAC OS or MS Windows, Linux, etc. The system is also not limited to text or numeric input. The system can be configured as an input control system. By performing gestures or touching the input device, the system can be configured to perform commands. For example, a user can input a gesture or a shape that will be interpreted by the system as a specific command. A user may be able to start a program command such as start media player by performing a specific input gesture or shape. These commands can be single touch sequence or multi touch inputs and the commands can be control commands for any computer or device. In other embodiments, the inventive system can be used to securely authenticate users after they type their password, even if they make small mistakes.

In contrast to other methods, the invention allows the user to type anywhere on a touch pad or touch screen and at various orientations, using a familiar keyboard layout like a QWERTY keyboard. The system is tolerant to text input transformations as well as imprecise input in general. Text input transformations can include: scaling, rotation, translation, warping, distortion, splitting, asymmetric stretching, etc. The user does not need to explicitly predefine/set the on-screen keyboard transformation, as this may automatically be deduced in real time and dynamically updated while typing. As a result users can type with an arbitrary keyboard in their minds by placing a finger(s) on the touch pad or the touch screen without the traditional need to always look at a keyboard layout. In an embodiment, a user familiar with the system could type on a touch pad or touch screen without an actual on-screen keyboard at all, using a keyboard transformation of their choice.

In addition to being a stand alone or integrated into an operating system, the inventive system may also be compatible with other types of text input and auto correction systems. For example, some text based input systems use prediction algorithms which attempt to predict what words or phrases the user would like to type. These systems may overlay possible text predictions based upon the first few letters that have been typed. Because these predictions can be based upon a substantial match of the first letters, if there is an error, these systems will not function properly. In contrast, the inventive system is based upon the geometric shape of words which is a completely different input interpretation. Thus, in addition to existing text prediction, the inventive system can be used in combination with the known text prediction systems to produce even higher text interpretation accuracy. These auto corrections systems can be layered on top of each other and the inventive word shape analysis can be one of these layers. In implementation, the system can display the possible candidate words or phrases.

The inventive system can be used with any type of keypad layout including QWERTY, Dvorak, Colemak, foreign language keyboards, numeric keypads, split ergonomic keyboards, etc. The inventive system is auto adaptive meaning that it will automatically adapt to the typing style and letter positions defined by the user and the word recognition will improve with use. The system can also adapt to the user by learning the user's typing style. For example, if a user types in a manner that is larger or smaller than a standard keyboard, the system will learn based upon the user's corrections the proper scale and position of the user's key position preferences. A user may type the word "FIND" but want to type the word "FINE". The user can inform the system of the intended word was "FINE" and the system will learn that the user types the letter "E" at a lower position than expected. An adjustment can be made and the system may expect the shape of words that include the letter E and are input by the user to have the position of the E at a lower position relative to the other letters in the future and adjust the stored dictionary word shapes for words that have the letter E accordingly. Various other additional changes in typing style can be made by the user and the system may automatically adapt to accurately interpret the word shapes.

With reference to FIG. 1, a block diagram is illustrated showing a CPU 103 coupled to an input device 101, a dictionary database 105, a user memory 107 and a display output 109. Information is input through the input device 101. The CPU 103 receives the data from the input device 101 and calculates the locations of the input points which may be the touch points and their sequence for an intended word. The CPU 103 processes the touch points and determines a sequence of X and Y coordinates associated with the input touch points. The CPU 103 may then perform additional processing to determine the intended word.

Figure 2:
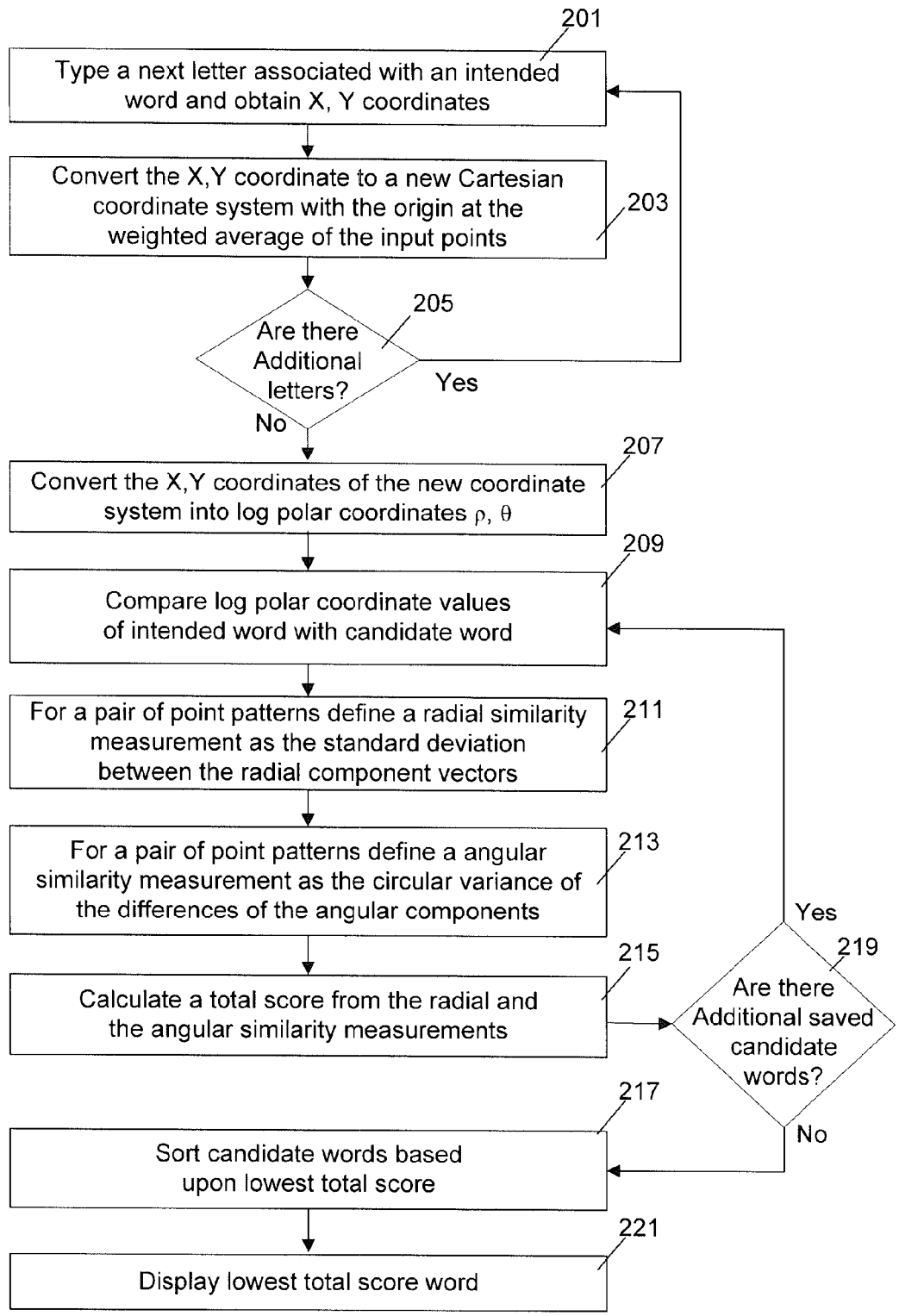
FIG. 2 illustrates flow chart of an embodiment of the inventive process.

With reference to FIG. 2, a flow chart of an embodiment of processing steps for determining an intended word from a set of touch point inputs is illustrated. The system can detect a touch input for a letter of an intended word 201. The location of the touch can be detected as an X, Y coordinate on the touch sensor. The system can then convert the X, Y coordinates from the input into a new Cartesian coordinate system. In the new Cartesian coordinate system, the origin or 0, 0 point is set to an anchor point such as a geometric median or some weighted average of the input points 203. The system will also detect additional letter inputs 205. If additional letters are input, the step 201 can be repeated and the origin point can be recalculated as more X, Y coordinates are obtained for each additional letter. In other embodiments, the system may wait until a predetermined number of letters have been input before performing the conversion of the X, Y coordinates to a new Cartesian coordinate system.

After some or all of the letters for the intended word have been input, the system can convert the X, Y values on the new Cartesian coordinate system for the intended word into a log polar coordinate system with each point having a $\rho$, $\theta$ for a log polar coordinate system. In a log polar system the r value can be the distance between the origin and the input letter position and in a log polar system the $\rho$ value can be the log of the distance between the origin and the input letter position. For log polar coordinate systems $\theta$ is the angular value of the input letter position relative to the origin. The equations for $\rho$ and $\theta$ are listed below.

$$\rho = \log \sqrt{X^2+Y^2} \quad \Theta = \arctan(Y/X)$$

The $\rho$ values for the intended word can be compared to the $\rho$ values of a set of candidate words 209. A basic concept of this comparison is to compare the radial similarities of the input intended word to a set of candidate words stored in a memory or database. The radial distances of the letters can be the distances between the origin and each of the input points. The radial distances of the input word can be compared to the stored radial distances of candidate words. In some embodiments, weights can be applied to each of the radial values of the point s. These values can be uniform, symmetric, asymmetric or any other suitable weigh system that can improve the matching of the inputs to the intended word.

In addition to the radial comparison, a rotational value similarity comparison can be performed for the intended word with the candidate words. The angular similarity analysis can be performed using a substantially different analysis than the radial value similarity comparison. In an embodiment, the $\theta$ values for each of the input point s of the intended word input from the polar or log polar coordinate values can be compared to the $\theta$ values for each of the point s of the candidate words 213. The differences between the detected and the angular values for the prospective words produce a $\Delta\theta$ value for each point. The $\Delta\theta$ values for all of the point s in the word can be multiplied by a weight. As discussed above with regard to the radial weights, the weights can be uniform, variable symmetric, variable asymmetric or any other weight configuration. The basic idea is that if a rotated word has uniform $\Delta\theta$ values for each of the point s this can indicate that there is a match between the input intended word and the stored prospective word.

Once the radial and angular values are determined for a candidate word, the system can determine if there are additional candidate words 219. If there are additional candidate words, the process is repeated. Alternatively, if there are no additional candidate words, the system will sort all of the candidate words to determine the best matching candidate word based upon a lowest standard deviation of radial distances and the lowest variance of angular values 217. The system can present the best candidate word to the operating system and the operating system may display the best candidate word 221. The system can then be repeated for the next candidate word.

If an error has been made and the best candidate word that was displayed is not the intended word, the user can input the intended word and the system can analyze where the error was made. In many cases, the user may have a tendency to type certain points in an atypical manner that is offset from a normal QWERTY or other keyboard pattern. The system can make the necessary adjustments to correct this problem so that when the user types the same intended word, the correct prospective word will be selected by the system.

Figure 3A:
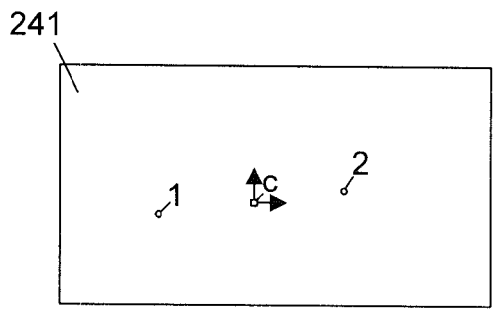
FIGS. 3A-3D illustrate the movement of the anchor point with the addition of input letters on a QWERTY keyboard and coordinate system.
Figure 3B:
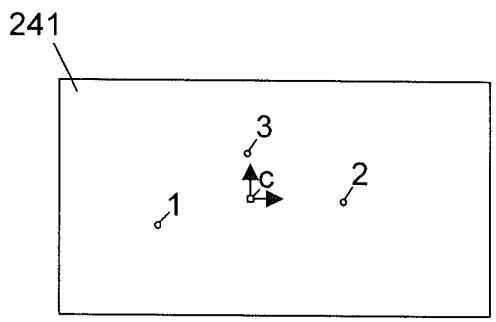
Figure 3C:
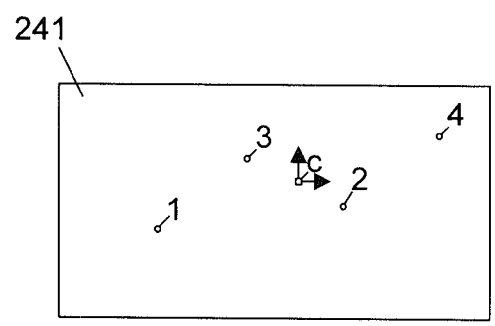
Figure 3D:
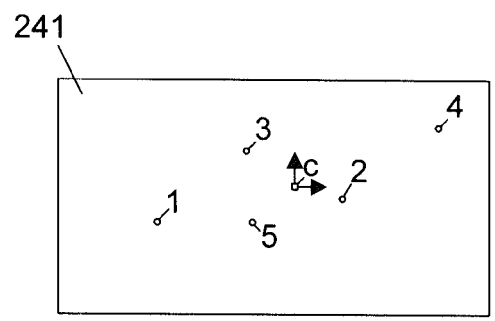

As discussed with reference to step 203 of FIG. 2 above, the X, Y input locations for the intended word can be converted to a new Cartesian coordinate system. With reference to FIGS. 3A-3D, graphical representations of the anchor point "A" are illustrated. As the points for the intended word are sequentially input, the system can convert the X, Y coordinates of the detected touch points on an input device 241 to a new Cartesian coordinate system. The 0, 0 origin point A of the new coordinate system can be set at the anchor point "A" of the input points 1, 2, 3, 4, 5 . . . . The anchor point location can be at the average or weighted average points of the input points. In FIG. 3A, the anchor point is between the first touch point 1 and the second touch point 2. In FIGS. 3B-3D, as additional points are added, the location of the anchor point A changes. The anchor point A can be based upon equal weighting of all of the input points. When weighting is used, the anchor point location C will shift and the weighted anchor point location can be calculated based upon the following equations:

$$X_{anchor\ point} = \mathrm{Sum}(X)(W_i)/((i)(\mathrm{Sum}\ W_i))$$

$$Y_{anchor\ point} = \mathrm{Sum}(Y)(W_i)/((i)(\mathrm{Sum}\ W_i))$$

Where: $W_i$=weight for the sequential point i, i=total number of points and

SUM ($W_i$)=cumulative weights for all total points.

Figure 4:
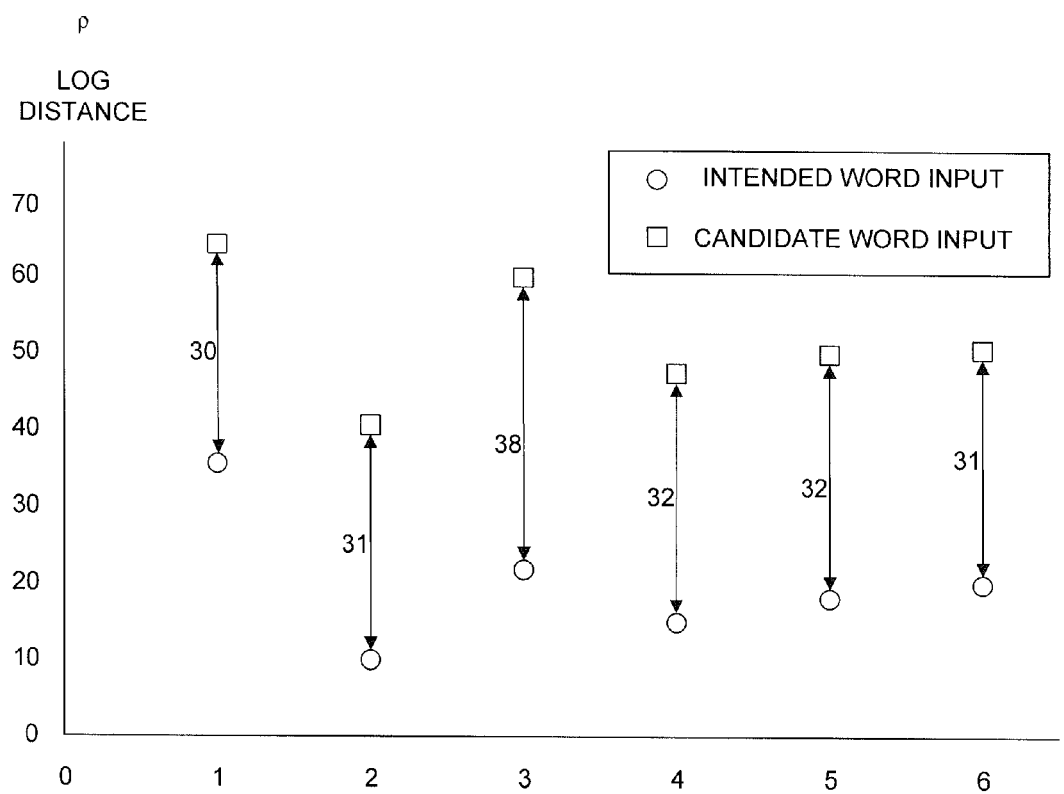
FIG. 4 illustrates the log distances of the letters of the candidate and intended words.

In an embodiment, the inputs for each touch point can be X(i), Y(i) and the anchor point value $X_{anchor\ point}$ can be calculated by Sum X(i)/N and the value of $Y_{anchor\ point}$ can be calculated by Sum Y(i)/N. In an example comparison, an intended word can have six input points and can be compared to a similar six point candidate word. With reference to FIG. 4, the radial values for an intended word and a candidate word are graphically illustrated. With reference to Table 1, the input radial log distances of the input points are compared to the stored radial distances of a stored candidate word. For each point a delta log distance is determined. This comparison can detect the similarities in the radial distances regardless of the scale. Thus, even if the radial distances for each point do not match, but the scaled radial distance values do match, the intended word will be considered to be a match with the candidate word.

TABLE 1

| | POINT # | | | | | |
|---|---|---|---|---|---|---|
| | 1 (A) | 2 (T) | 3 (O) | 4 (M) | 5 (I) | 6 (C) |
| CANDIDATE WORD LOG DISTANCE ρ | 64 | 41 | 60 | 47 | 50 | 51 |
| INTENDED WORD LOG DISTANCE ρ | 36 | 10 | 22 | 15 | 18 | 20 |
| Δ LOG DISTANCE ρ | 28 | 31 | 38 | 32 | 32 | 31 |

In the comparison analysis, the system can determine the similarities of the radial values and rotational values for the intended word and a set of candidate words. In some embodiments, weights can be applied to each of the radial values of the points. These values can be uniform, symmetric, asymmetric or any other suitable weigh system that can improve the matching of the inputs to the intended word. An average Δ log distance can be calculated to be 31.5 and a standard deviation can be calculated to be 0.7906. A low standard deviation indicates that the candidate word is very similar to the intended word with a standard deviation of 0 indicating a perfect match. This process can be repeated for all candidate words and the standard deviation can be used to measure the similarity of the intended word to the candidate word. The scale factor between the intended and candidate words can be calculated to be $e^{average\ \Delta\ log\ distance}$.

In other embodiments, weights for the radial distance values can be applied. The described anchor point calculation above can be an example of a uniform weight applied to each point. It is also possible to apply weights in a non-uniform manner. With reference to Table 2, the weights for the different input points are listed and applied resulting in a change in the Δ Weighted Log Distance ρ values. In this example, the weights are asymmetric increasing with each incremental point position. In other embodiments, any other suitable type of weighting can be used.

TABLE 2

| | POINT # | | | | | |
|---|---|---|---|---|---|---|
| | 1 (A) | 2 (T) | 3 (O) | 4 (M) | 5 (I) | 6 (C) |
| Δ LOG DISTANCE ρ | 28 | 31 | 38 | 32 | 32 | 31 |
| STANDARD DEVIATION | 16 | 1 | 36 | 0 | 0 | 1 |
| WEIGHT | 0.4 | 0.8 | 1.6 | 2.8 | 4.0 | 5.6 |
| WEIGHTED STANDARD DEVIATION OF Δ LOG DISTANCE ρ | 6.4 | 0.8 | 57.6 | 0 | 0 | 5.6 |

In other embodiments, the anchor point can be based asymmetrically upon the input points. For example, the anchor point may only be based upon the locations of the first 3, 4, 5 . . . points rather than all points. Alternatively, the anchor point can be based on the locations of the last 3, 4, 5 . . . points. The weighting should be applied uniformly to both the input intended word as well as all candidate words.

As discussed, the rotational value similarity comparison can be performed in a substantially different analysis than the radial value similarity comparison since a traditional standard deviation cannot be used on values that represent angles. Angular values are measurements that extend around a circle such as 360° and then repeat with higher angles. Because this is substantially different than linear distance measurements, a standard deviation of the angles cannot be applied. With reference to FIG. 2, the θ values for each of the input points of the intended word input can also be compared to the θ values for each of the points of the candidate words 213. The angular values from the anchor point for the input points of the intended word can be determined. These values can also be compared to the angular values for the prospective words and the Δθ can be determined for each point as shown in Table 3.

TABLE 3

| | POINT # | | | | | |
|---|---|---|---|---|---|---|
| | 1 (A) | 2 (T) | 3 (O) | 4 (M) | 5 (I) | 6 (C) |
| CANDIDATE WORD θ | 195 | 155 | 32 | 338 | 55 | 240 |
| INTENDED WORD θ | 185 | 143 | 16 | 327 | 41 | 222 |
| Δθ | 10 | 12 | 16 | 11 | 14 | 18 |

Figure 5:
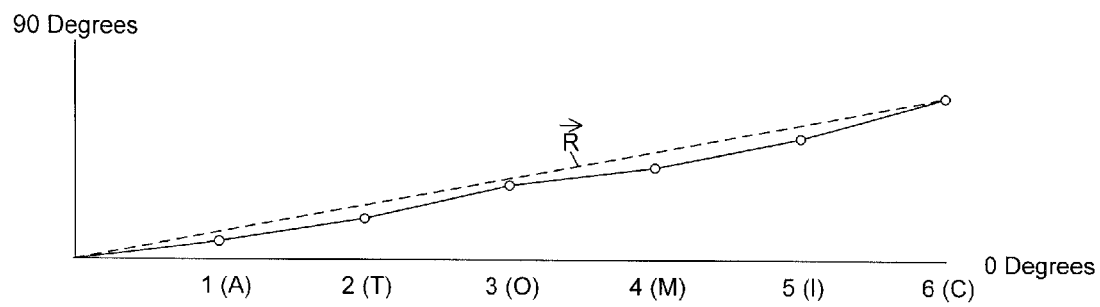
FIG. 5 illustrates $\Delta\theta$ values plotted for each letter.

With reference to FIG. 5, the Δθ values can be plotted with respect to each letter. Because weights have not been applied or uniform weights have been applied, the distances between each of the inputs are the same. A line drawn between the origin and the end point 6 (C) represents a vector that has an angle that is the average shift angle between the input intended word and the prospective word. The angular similarity can be measured by observing the "straightness" (circular variance) of the Δθ vectors, which is a function of the sum of the lengths of those vectors and the length of the combined vector. The more similar those two values are, the more uniform the delta angle vectors are.

Figure 6:
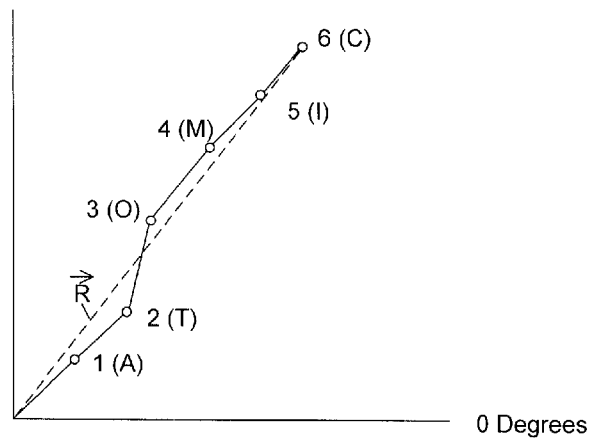
FIG. 6 illustrates weighted $\Delta\theta$ values plotted for each letter.

In other embodiments non-uniform weights can be applied to the angular values as shown in Table 4. The calculation of the circular variance can be performed as follows. The angles of the graphical segments are the Δθ for each sequential letter and the lengths of the segments are based upon the weights of the letters. In this example, a non-uniform weight is applied to each of the angular values. The weighted Δθ values can be plotted for each letter as shown in FIG. 6.

TABLE 4

| | LETTER # | | | | | |
|---|---|---|---|---|---|---|
| | 1 (A) | 2 (T) | 3 (O) | 4 (M) | 5 (I) | 6 (C) |
| WEIGHT | 2.9 | 3.5 | 4.7 | 4.7 | 3.5 | 2.9 |
| CANDIDATE WORD θ | 565.5 | 542.5 | 150.4 | 1588.6 | 192.5 | 696 |
| INTENDED WORD θ | 536.5 | 500.5 | 75.2 | 1536.9 | 143.5 | 643.8 |
| Δθ | 29 | 42 | 75.2 | 51.7 | 49 | 52.2 |

In another embodiment, the system can determine the angular similarities by other calculations. The system may initialize the statement machine based upon the following equations: sum Sin=0, sum Cos=0 and sum Weights=0. For each point an angle weight pair will be provided and these polar values can be broken up in to horizontal and vertical values and cumulative weight values as represented by the equations:

$\Delta\theta_i$ = candidate point $\theta_i$ − intended point $\theta_i$

Sum Sin = Sum Sin + Sin($\Delta\theta_1$)($W_i$)

Sum Cos = Sum Cos + Cos($\Delta\theta_1$)($W_i$)

Sum Weights = Sum Weights + $W_i$

The angular variance can be defined as 1−||R||/Sum Weights and can represent the angular similarity of the candidate word to the intended input word.

Figure 7A:
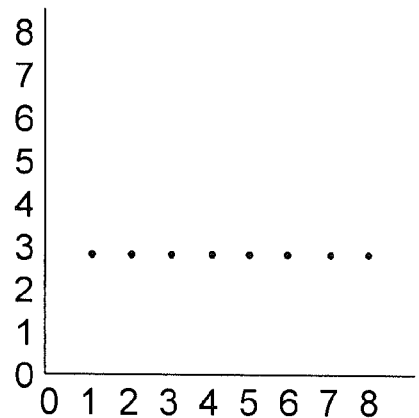
FIGS. 7A-7C illustrate different weight patterns.
Figure 7B:
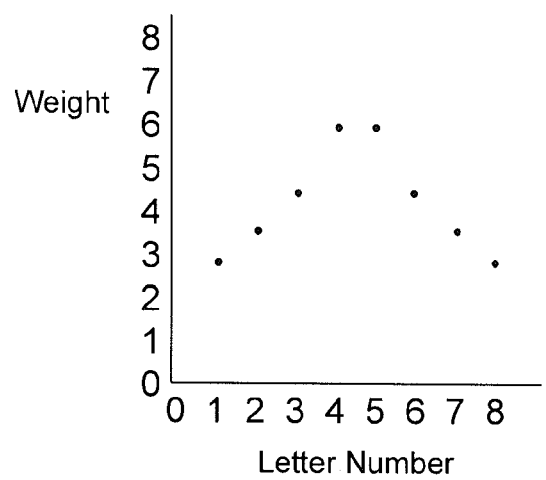
Figure 7C:
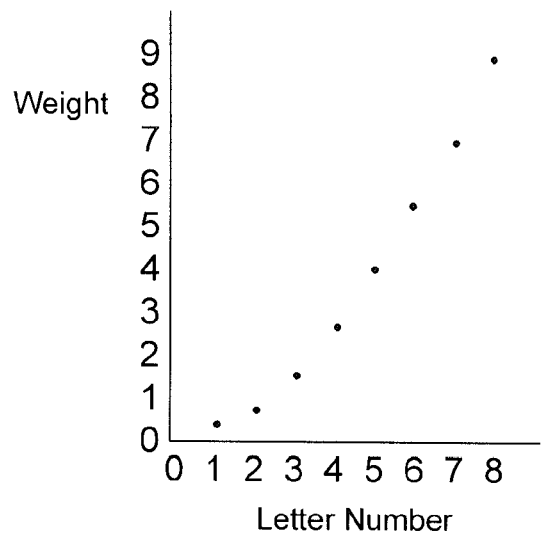

Weights can be applied to each sequential point in the input word. With reference to FIGS. 7A-7C, a graphical representation of the different weights are illustrated with the lower horizontal X axis representing the sequential input points and the vertical Y axis representing the weight value. In an embodiment, the weight values can be uniform for all input points as shown in FIG. 7A. In other embodiments, the weight values can be variable symmetric as shown in FIG. 7B. In a variable symmetric weight scheme, the weights can be applied in a symmetric manner to the points such that the weights for one group of input points are symmetric with the weights for another group of points. In this example, the weights for input points 1-4 are symmetric to the weights for input points 5-8. In another embodiment, the weights can be applied in a variable asymmetric manner as shown in FIG. 7C. In this example, the weights for the input points increase asymmetrically with the increased input number. In other embodiments, any other suitable weighting can be applied to the input points.

In order to determine the prospective words to compare the intended input word to, with reference to FIG. 1, the processor 103 can be coupled to a dictionary 105 or database of words and their corresponding polar or log polar coordinates. The matching of the candidate words to the intended input word can be done in different ways. For example, in an embodiment, a multi step process can be used. In the first step, the candidate words can be determined based upon the number of points in the input intended word shape. Then each candidate word can be compared to the input radial data and given a radial similarity score. Words that have shape scores above a certain threshold value are eliminated and the next candidate word is analyzed. Similar processing of the angularity similarity can be performed and candidate words below a threshold value can be eliminated. This process can continue until there is a much smaller group of candidate words.

The dictionary may store words by their normal spelling as well as by the number of points and in groups by prefix. Because the shape of a word is based upon the number of points, the system may initially only search for matching word shapes that have the same number of points. In addition, the system can also search based upon prefixes. Each prefix of points may represent a distinct shape and the system can recognize these prefix shapes and only search words that have a matching prefix shape. Various other search processes can be performed to optimize the dictionary search results.

In an embodiment and for illustrative purposes, the invention will be described with a touch pad as the input device and the letter layout in a QWERTY format. A user will touch a touch sensitive input device based upon the relative positions of a QWERTY type keyboard in a sequence to type in words. A keyboard can be displayed on the touch sensitive input device as a guide for the user. However, the user is not restricted to touching the areas of the screen defined by the displayed keyboard. In an embodiment, with reference to FIG. 3, a keyboard can be displayed and the locations of the different letters can be shown with each of the letters having different X and Y coordinates on the input device. In contrast to this type of fixed keyboard, the present invention may be thought of as a virtual keyboard that can be located at any area of the input device. The center of the virtual keyboard moves with the user's input points and the center of the user's typing area can be X'=0, Y'=0 with the X' axis along a horizontal direction and the Y' axis extending from the top to the bottom of the virtual keyboard. Letters on the upper right such as U, I O, P will have a $X_{UIOP}$ and $Y_{UIOP}$, letters on the lower right such as B, N, M will have $X_{BNM}$ and $Y_{BNM}$, letters on the upper left such as Q, W, E, R will have $X_{QWER}$ and $Y_{QWER}$ and letters on the lower left such as Z, X, C, V will have $X_{ZXCV}$ and $Y_{ZXCV}$. Since the X and Y values are relative, the relationship between the different X and Y values can be $X_{UIOP} > X_{QWER}$, $X_{BNM} > X_{ZXCV}$, $Y_{QWER} > Y_{ZXCV}$ and $Y_{UIOP} > Y_{BNM}$.

As the user types, each word can be represented by a sequence of detected point locations. The system will record and analyze these sequences of point positions for each word that is typed into the input device and determine a geometric shape for each word based upon the relative positions of the touch points. Because each word has a unique spelling, each word may most likely have a unique geometric shape. However, two words may have a similar pattern. A first pattern may represent a word typed right side up and a second pattern may represent a word typed upside down. The system can utilize additional information such as the orientation of the input device, the orientation of adjacent words, etc. to determine the proper orientation of the input pattern.

Figure 8:
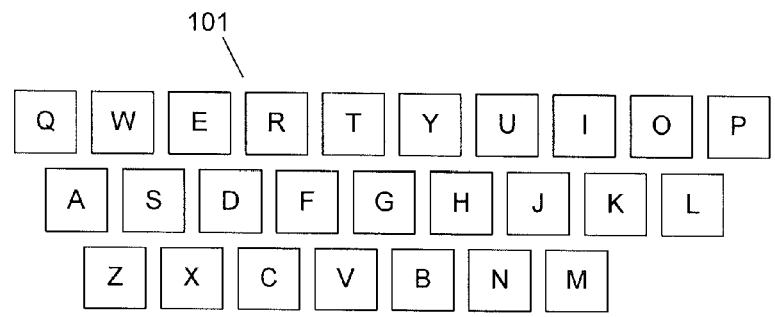
FIGS. 8 and 9 illustrate top views of a U.S. QWERTY keyboard.
Figure 9:
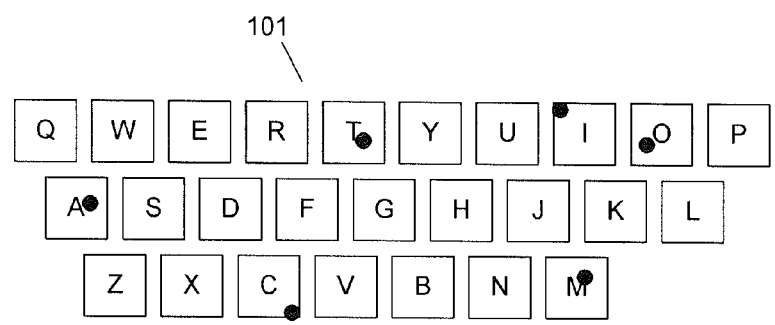
Figure 10:
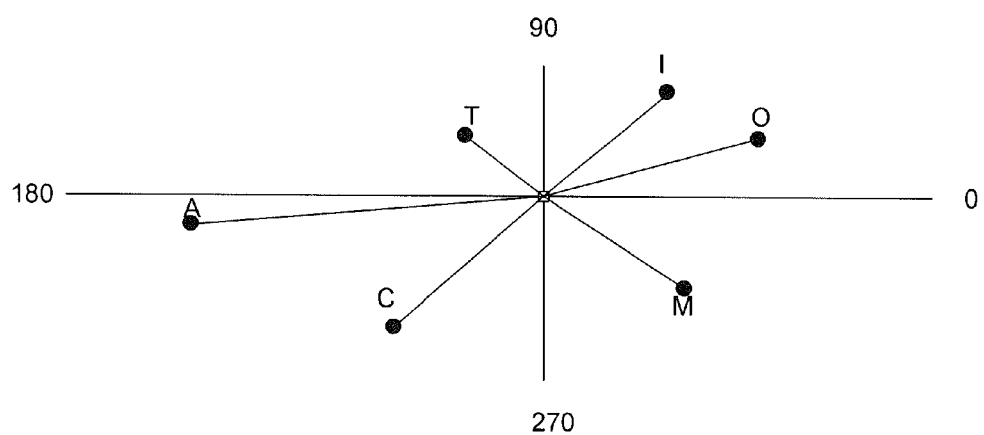
FIG. 10 illustrates the points for an input word on a polar coordinate system.

FIGS. 8 and 9 illustrate a touch screen type input device 101 and a user can type in words by sequentially touching the letters of the keyboard that spell the word. In this example, the work "atomic" can be represented by the sequence of six virtual keyboard point locations. With reference to FIG. 10, as discussed above, the locations of the touch point can be converted to anchor point relative points based upon their positions relative to the anchor point as previously defined. From the anchor point 0,0 point, the radial distances and the angular values for each point of the input intended word can be determined.

Since the location detection is completely independent of any markings on the input device, a keyboard does not have to be displayed at all on the input device. Because the words are based upon the geometric shape rather than the specific locations of the points that are typed, the inventive system is not confined to a defined keyboard area of the input device. The user can type the words in any scale and in any rotation or translation on the input device and the system will be able to determine an intended word. Because many users may be able to touch type and be familiar with the relative locations of the different alphabetical keys, these users can type on a displayed keyboard or a blank touch sensitive input device without the displayed keyboard. Alternatively, a very small keyboard layout can be displayed off of the touch sensitive portion as a reference for users who do not have the keyboard layout memorized. By eliminating the keyboard, more of the display is available for displaying other information. This may be particularly useful for mobile phone users who have small touch sensitive screens who would like to display as much information as possible.

Because the system analyzes the shapes of words, an indication of when a word starts and ends may be needed. When people type, the words are separated by a space or a punctuation mark. Thus, in an embodiment, the space key can be a signal the beginning of a word and a space or a punctuation key may indicate the end of a word. In other embodiments, a user may wish to avoid the space and punctuation keys all together. In these embodiments, the user may signal the end of a word through the input device in any way that is recognized by the system. For example, the user may swipe across a touch pad to indicate that a word is completed. In other embodiments, any other signal can be used to indicate that the word is finished. In yet other embodiments, the user may continuously type words without any spaces or punctuation between the words. The system may be able to automatically interpret each of the different words in the user's typing and separate these words.

An initial comparison can be performed between the intended word shape that is input and the corresponding geometric information of known words in the dictionary. The system may only make the initial comparison of the radial similarity of the first intended word to dictionary words that have the same number of points. The comparison will result in a calculated value which is the radial similarity score for each of the candidate words in the dictionary. A similar process can be performed for the angular similarity analysis. In an embodiment, the system may display one or more words that are most radially and angularly similar to the pattern input into the touch sensitive device. The user can then input a signal that the displayed word is the correct intended word.

Based upon the transformation analysis, the known candidate words are each given a transformation score which can be defined as a function of the scale factor, average angle and $\Delta$ of the anchor point found for each candidate when compared against the input. The system can then add additional factors to the transformation score. For example, in an embodiment, the system can add frequency values. For example, the total score of a candidate word can be the transformation score+the shape score+the frequency score. The frequency score can be based upon the normal usage of the candidate word and/or the user's usage of the candidate word. The normal usage of the candidate word can be the rating usage relative to other words in normal language, publications, etc. The user usage score can be based upon the user's specific use of the candidate word. During use, the system will detect when each word is used by a user. The system can analyze all of the user's writing and determine what words the user tends to use and create higher user ratings for commonly used words and lower ratings for infrequently used words. If the candidate word is a commonly used word in general and a commonly used word by the user, the system can account for this by increasing the total score for that candidate word making this candidate word more likely to have the highest total score. In contrast, if the candidate word is uncommon and not frequently used in general or by the user, the system can produce a lower frequency score reducing the probability this word will have the highest total score. The system will determine if there are additional saved candidate words. If there are more saved candidate words, the additional processing is repeated. The system can store the user data and use this data to more accurately predict the candidate words in the future.

In some cases, the user may not input the correct number of points into the input device. In these situations, the geometry of the intended word will not correspond to the geometry of the correct candidate word. In an embodiment, the system will analyze the geometric shape of the word with an additional location between each pair of adjacent locations for the shape of the intended word. For example, the intended word is COMPUTER, but the user may have omitted the letter M and input a sequence of points for COPUTER. The system may not find a good candidate based upon the shape and translation analysis. The system can then perform a separate analysis based upon missing points. Normally, the system will only search for words that have the same number of points that were input. However, if a good match is not found, the system can search candidate words that have one additional point. In this example, the system will look at all possible candidate words that have 7 points rather than 6 points. The system can analyze all candidate words by looking at the shapes of the candidate words with one point missing. For example, for the candidate word, computer, the shapes of _omputer, c_mputer, co_puter, com_uter, comp_ter, compu_er, comput_r, and compute_ will be compared to the shapes of the input word shape. The same described analysis can be performed and the correct candidate word can be determined even though one point was missing from the input.

A similar process can be used to identify the correct candidate word when one extra point is included. For example, the user may have input points corresponding to the points "commputer". In this case, the system will compare the shape of all variations of the input, excluding one input point at a time. Thus, the system will analyze the shape of the text: _ommputer, c_mmputer, co_mputer, com_puter, comm_uter, commp_ter, commpu_er, commput_r, and commpute_. Again, the shapes of the modified input word will compared to the input word shape using the described shape score comparison process. While the process has been described for one missing and one additional point, similar processes can be used for multiple missing or multiple additional points or combinations of missing and extra points.

In another embodiment, the system may also be able to analyze swapped points. For example, a user may have swapped two adjacent points. If the user input "compuetr," the system will look at the shapes of candidate words with two points swapped. For the candidate word computer, the system would analyze the input word based upon a swapping of the adjacent points such as: ocmputer, cmoputer, copmuter, comupter, comptuer, computer and compuert or any other combination of swapped points. The system would make the match when the proper points are swapped based upon the described shape and translation processes.

Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method comprising:
   at an input device having one or more processors and memory storing programs for execution by the one or more processors,
   receiving user touches on a virtual keyboard to enter a first intended word;
   detecting a first sequence of points corresponding to the user touches on the input device;
   identifying a first set of radial distances associated with letters of the first intended word, wherein the first set of radial distances are determined based on a layout of the virtual keyboard by measuring distances between an origin and each of the first sequence of points corresponding to the respective letters;
   identifying a first set of angular values associated with the letters of the first intended word, wherein the first set of angular values are determined based on the layout of the virtual keyboard by measuring the angular values from the origin for the first sequence of points corresponding to the respective letter;
   comparing automatically the first set of radial distances to sets of radial distances associated with words stored in an electronic dictionary, wherein the dictionary stores a set of radial distances and angular values for each of the words;
   comparing automatically the first set of angular values to sets of angular values associated with the words stored in the dictionary; and
   identifying the word stored in the dictionary having the radial positions that most closely match the first set of radial distances and the angular values that most closely match the first set of angular values of the first intended word.

2. The method of claim 1 further comprising:
   displaying the word stored in the dictionary having the radial positions and the angular values that most closely matches the first intended word on a visual display.

3. The method of claim 2 wherein the input device and the visual display are components of a touch screen.

4. The method of claim 1 further comprising:
   displaying the keyboard layout on the input device;
   wherein the input device is a touch screen.

5. The method of claim 1 wherein the radial distances relative to an origin associated with letters of the first intended word are measured as log distances.

6. The method of claim 5 further comprising:
   determining a standard deviation of the log distances.

7. The method of claim 5 further comprising:
   applying weights to the standard deviation of the log distances.

8. A method comprising:
   at an input device having one or more processors and memory storing programs for execution by the one or more processors,
   receiving user touches on a virtual keyboard to enter a first intended word;
   detecting a first sequence of locations corresponding to the user touches upon a keyboard layout;
   identifying a first set of X and Y coordinate points associated with letters of the first intended word;
   converting the first set of X and Y coordinate points into a Cartesian coordinate system with an origin at the weighted average of the first set of X and Y coordinate points;
   converting the first set of X and Y coordinate points into log polar coordinate points from the origin, each of the points having $\rho$ and $\theta$ values, wherein the $\rho$ values are determined by measuring distances between the origin and the X and Y coordinate points, the $\theta$ values are determined by measuring angular values of the X and Y coordinate points relative to the origin;
   comparing automatically the $\rho$ values to a set of log polar coordinate points associated with words stored in an electronic dictionary, wherein the dictionary stores the words by spelling as well as by number of points and in groups by prefix;
   comparing automatically the $\theta$ values to a set of angular values associated with the words stored in the dictionary; and
   identifying the word stored in the dictionary having the radial positions that most closely match the first set of radial distances and the angular values that most closely match the first set of angular values of the first intended word.

9. The method of claim 8 further comprising:
   displaying the word stored in the dictionary having the radial positions and the angular values that most closely matches the first intended word on a visual display.

10. The method of claim 9 wherein the input device and the visual display are components of a touch screen.

11. The method of claim 8 further comprising:
 displaying the keyboard layout on the input device;
 wherein the input device is a touch screen.

12. The method of claim 8 wherein the radial distances relative to an origin associated with letters of the first intended word are measured as log distances.

13. The method of claim 12 further comprising:
 determining a standard deviation of the log distances.

14. The method of claim 13 further comprising:
 applying weights to the standard deviation of the log distances.

15. The method of claim 1, wherein the virtual keyboard is a QWERTY keyboard.

16. The method of claim 1, wherein the dictionary stores the words by spelling as well as by number of points and in groups by prefix, wherein the prefix represents a distinct shape of the points.

* * * * *